(12) United States Patent
Tashiro

(10) Patent No.: US 9,047,206 B1
(45) Date of Patent: Jun. 2, 2015

(54) DISK DRIVE APPARATUS AND METHOD OF MANUFACTURING THE DISK DRIVE APPARATUS

(71) Applicant: Kabushiki Kaisha Toshiba, Minato-ku, Tokyo (JP)

(72) Inventor: Masami Tashiro, Komae Tokyo (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/522,267

(22) Filed: Oct. 23, 2014

Related U.S. Application Data

(60) Provisional application No. 62/033,301, filed on Aug. 5, 2014.

(51) Int. Cl.
*G06F 12/06* (2006.01)
*G06F 11/10* (2006.01)

(52) U.S. Cl.
CPC ........ *G06F 11/1016* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 4,953,122 A * | 8/1990 | Williams | 711/4 |
| 6,185,058 B1 | 2/2001 | Dobbek et al. | |
| 6,412,083 B1 * | 6/2002 | Rothberg et al. | 714/42 |
| 6,539,518 B1 * | 3/2003 | Fang et al. | 714/805 |
| 6,895,490 B1 * | 5/2005 | Moore et al. | 711/203 |
| 7,394,606 B2 * | 7/2008 | Tashiro et al. | 360/53 |
| 7,461,197 B2 * | 12/2008 | Southerland et al. | 711/4 |
| 8,134,793 B1 * | 3/2012 | Vasquez et al. | 360/53 |
| 8,320,067 B1 * | 11/2012 | Tsai et al. | 360/31 |
| 2003/0133384 A1 * | 7/2003 | Yada et al. | 369/53.45 |
| 2007/0094442 A1 | 4/2007 | Ito et al. | |
| 2013/0031296 A1 | 1/2013 | Na | |

\* cited by examiner

*Primary Examiner* — Peter Vincent Agustin
(74) *Attorney, Agent, or Firm* — White & Case LLP

(57) ABSTRACT

In a disk drive apparatus, a plurality of data sectors is recorded on a disk. A data sector is designated by a logical block address in accordance with a read command received from a host, and the data is read from the data sector specified by a physical address corresponding to the designated logical block address included in the read command. Predetermined data different from the data read from the designated data sector is sent back to the host in response to information relevant to the physical address included in the read data.

14 Claims, 5 Drawing Sheets

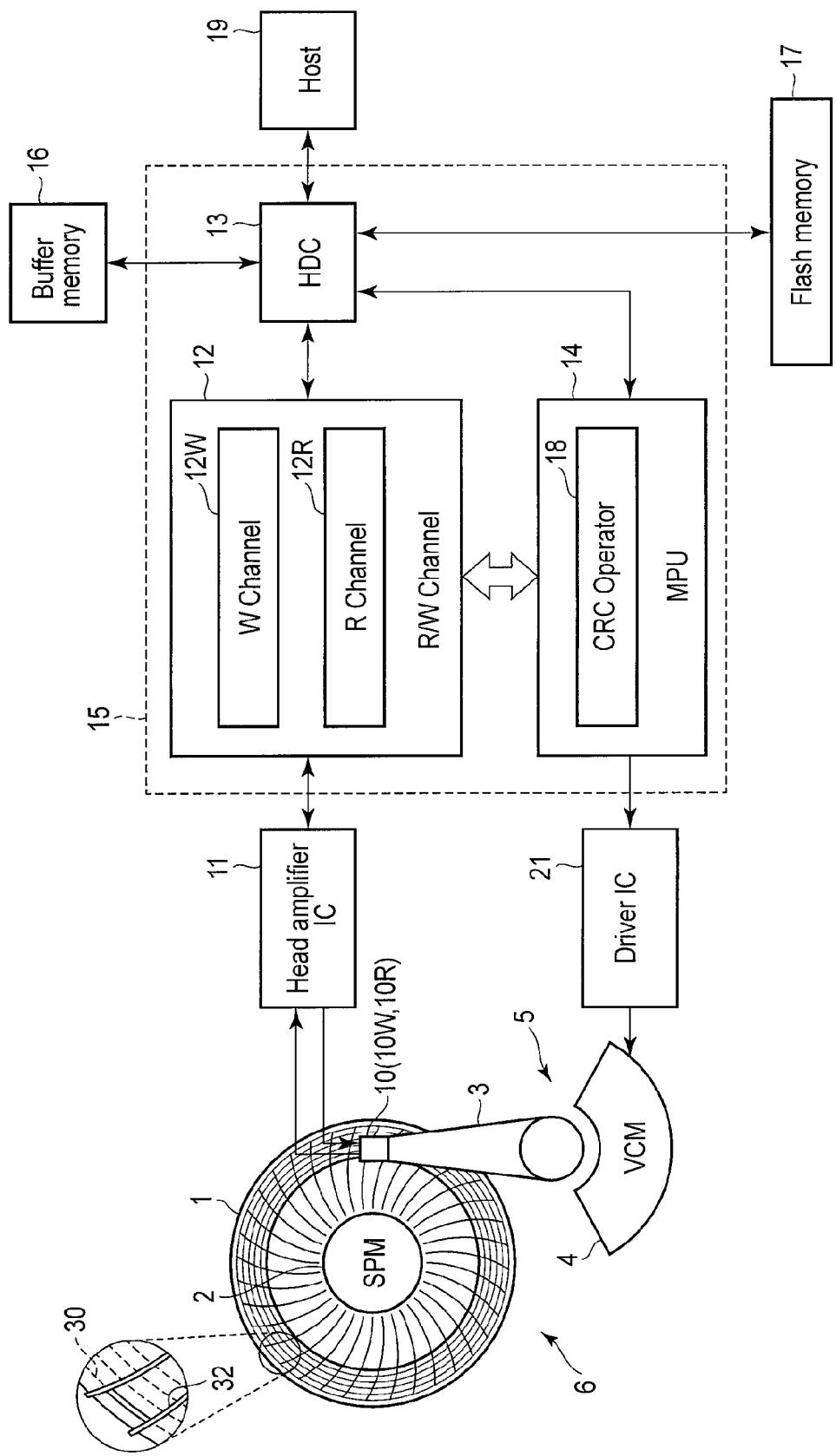
F I G. 1

Management table

| Physical address | Sector(S0) | Sector(S1) | Sector(S2) | Sector(S3) | Sector(S4) | Sector(S5) | Sector(S6) | Sector(S7) | Sector(S8) | ... |
|---|---|---|---|---|---|---|---|---|---|---|
|  | P0 | P1 | P2 | P3 (Defect X) | P4 | P5 | P6 | P7 | P8 | ... |
| LBA | L0 | L1 | L2 | — | L3 | L4 | L5 | L6 | L7 | ... |

F I G. 3

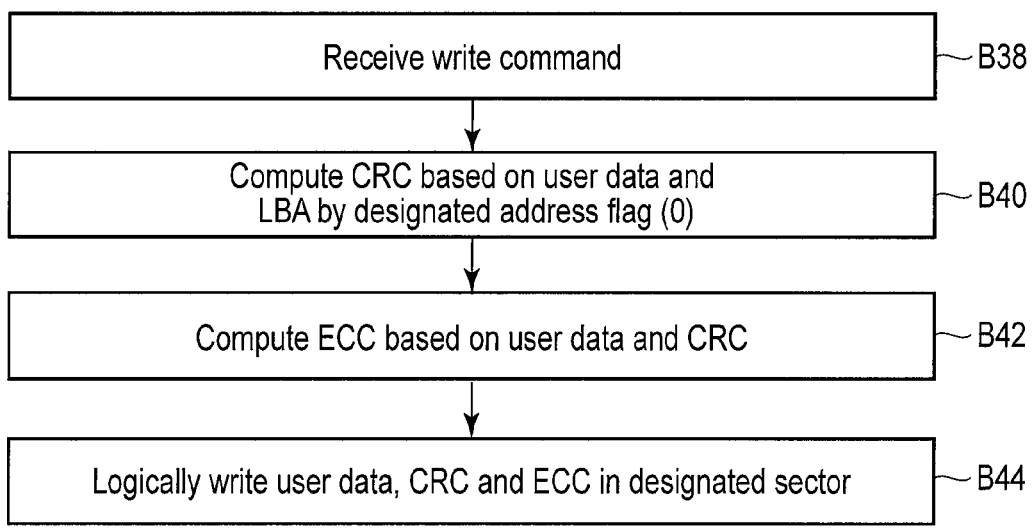
F I G. 5

DISK DRIVE APPARATUS AND METHOD OF MANUFACTURING THE DISK DRIVE APPARATUS

CROSS-REFERENCE TO RELATED APPLICATIONS

This application claims the benefit of U.S. Provisional Application No. 62/033,301, filed Aug. 5, 2014, the entire contents of which are incorporated herein by reference.

FIELD

Embodiments described herein relate generally to a disk drive apparatus and a method of manufacturing the disk drive apparatus.

BACKGROUND

Recently, increase in recording density on a magnetic disk serving as a storage medium has been promoted in the technical field of a disk drive apparatus such as a hard disk drive (hereinafter simply called a disk drive). In accordance with the increase in recording density, storage capacity of the disk drive has been also increased and a disk drive of some terabytes (TB) has been developed.

The disk drive is shipped from a factory after its disk is subjected to physical formatting and then subjected to logical formatting and product test during a manufacturing process. The product test includes a step of inspecting a defect of the storage medium (magnetic disk). In this step, a storage medium surface is inspected by an inspection pattern for a surface analysis test (SAT). A defective portion is specified by a physical address of a defective sector. In addition, a logical block address (LBA) is allocated to sectors other than the defective sector, and a logical-physical conversion table for converting the LBA to the physical address is recorded in a system region. In a final step of manufacturing the disk drive, the disk is subjected to the logical formatting, and all zero data is written in a user region as a pattern for formatting.

The above formatting is finished for a short inspection time, for the disk drive of small capacity. In the recently developed disk drive of a large capacity, for example, some terabytes (TB), however, the formatting often takes some tens of hours, which is considered to cause the time required for the manufacturing process to increase. Enhancement of efficiency and simplification in the disk drive manufacturing process are thus required.

BRIEF DESCRIPTION OF THE DRAWINGS

FIG. 1 is a block diagram showing a structure of a disk drive of an embodiment.

FIG. 3 is an illustration showing a conversion table for converting a logical block address recorded in a system region of a magnetic disk shown in FIG. 1 to a physical sector address.

FIG. 5 is a flowchart showing writing to a designated sector in the disk drive of the embodiment.

DETAILED DESCRIPTION

Figure 2:
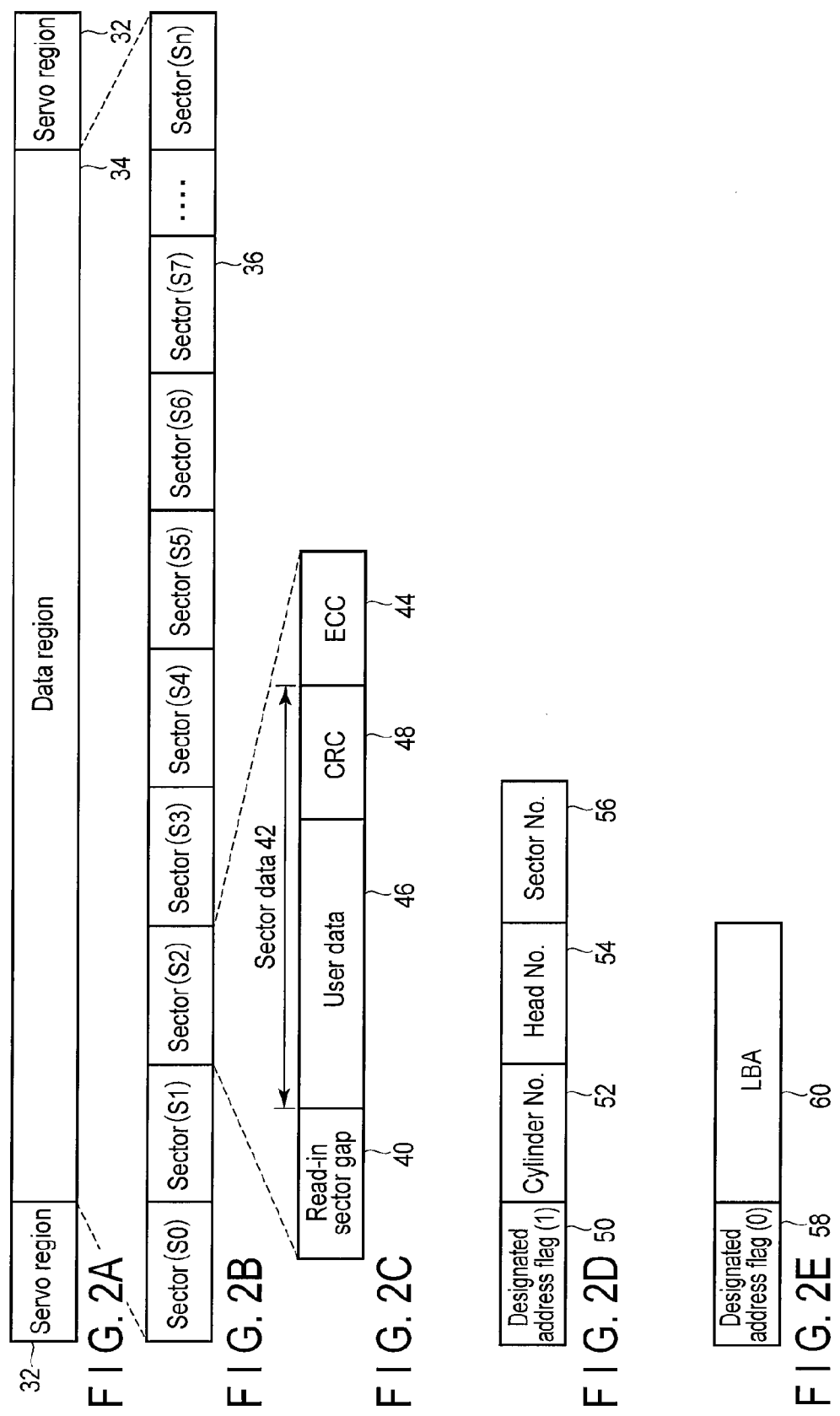
FIG. 2A is an illustration showing a structure of a track formed in a disk shown in FIG. 1.
FIG. 2B is an illustration showing a structure of a data region shown in FIG. 2A.
FIG. 2C is an illustration showing a structure of a sector shown in FIG. 2B.
FIG. 2D is an illustration showing physical address information included in CRC shown in FIG. 2C.
FIG. 2E is an illustration showing logical block address information included in the CRC shown in FIG. 2C.

A disk drive apparatus and a method of manufacturing the disk drive apparatus of various embodiments will be described hereinafter with reference to the accompanying drawings.

In general, according to one embodiment, there is provided a disk drive apparatus, comprising a disk including a plurality of data sectors each having a region for recording user data; and a controller which receives a read command from a host, the read command including a logical block address for designating a data sector, reads data from the designated data sector specified by a physical address corresponding to the logical block address included in the read command, and sends back predetermined data to the host, the predetermined data being different from the data read from the designated data sector, in response to information relevant to the physical address included in the read data.

FIG. 1 is a block diagram schematically showing a disk drive of the embodiment.

The disk drive comprises a head-disk assembly (HDA) 6, a head amplifier integrated circuit (hereinafter called head-amplifier IC) 11, a controller 15, and a driver IC 21 as shown in FIG. 1. The controller 15 is configured as a one-chip integrated circuit comprising an R/W channel (RDC) 12, a hard disk controller (HDC) 13, and a microprocessor (MPU) 14.

The HDA 6 comprises a plurality of magnetic disks 1 serving as storage media, a spindle motor (SPM) 2, an arm 3 equipped with a head 10, and a voice coil motor (VCM) 4. The disks 1 are rotated by the SPM 2. The arm 3 and the VCM 4 constitute an actuator 5, and move ("seek") the head 10 to a target position on the disks 1. In other words, the actuator 5 moves the head 10 built in the arm 3 in a radial direction of the disk 1, by the drive of the VCM 4. The VCM 4 is controlled to drive by a drive current from the driver IC 21.

The head 10 is provided for the plural disks 1, and comprises a write head 10W and a read head 10R mounted in a slider (not shown). The read head 10R reads data recorded on a data track on each disk 1. The write head 10W writes data on the disks 1. In a disk structure in which recording layers are provided on both surfaces of each disk 1 so as to allow the data to be written on the recording layers of the both surfaces, the heads 10 are provided to be opposed to the both surfaces of each disk 1. By designating one of the plural heads 10, one of the recording layers on the plural disks 1 can be designated.

The head amplifier IC 11 comprises a read amplifier and a write driver. The read amplifier amplifies a read signal which is read by the read head 10R, and transmits the read signal to the read/write (R/W) channel 12. The write driver transmits a write current corresponding to the write data output from the R/W channel 12 to the write head 10W.

The R/W channel 12 includes a read channel 12R for executing read data signal processing and a write channel 12W for executing write data signal processing. For example, the read channel 12R processes the read signal which is read by the read head 10R, and decodes the data (including servo information). The write channel 12W processes the write data from the HDC 13 and encodes the write data to data which is to be written by the write head 10W.

The HDC 13 controls data transfer between a host 19 and the RDC 12. The HDC 13 controls a buffer memory 16 to execute data transfer control by temporarily storing the read data and the write data in the buffer memory 16. In addition, the HDC 13 controls a flash memory 17 and, for example, stores and reads a program which is to be executed by the MPU 14 or an apparatus parameter.

A volatile memory such as a DRAM or an SRAM is employed as the buffer memory 16. A non-volatile memory such as a NAND memory is employed as the flash memory 17. The data stored in the flash memory 17 is temporarily decompressed in the buffer memory 16, during operation of the disk drive.

The MPU 14 corresponds to a main controller of the disk drive and is often called a microcontroller. The MPU 14 controls the VCM 4 via the driver IC 21 and executes positioning control (servo control) of the head 10. Furthermore, the MPU 14 controls data recording and reading via the RDC 12. The MPU 14 constitutes a CRC operator 18 which generates a CRC code to be added to the user data and which verifies the user data by the CRC code, as described later. The CRC operator 18 may be provided in the HDC 13 as hardware.

A number of cylinders (tracks) 30 in which the data is to be recorded are provided on the disks 1, along circumference of the disks, as shown in FIG. 1. Servo regions 32 are spaced apart and aligned in a direction of the circumference, in the cylinders 30. Each of the servo regions 32 is extended along an approximately radial direction of the disks 1. In addition, a system region for managing the data recorded in the disks 1 is provided at parts of the outermost circumferential cylinder 30.

Next, a disk structure will be described with reference to FIG. 2A to FIG. 2E and FIG. 3. FIG. 2A shows a structure of the track formed on the disk shown in FIG. 1, and FIG. 2B shows a structure of the data region shown in FIG. 2A. In addition, FIG. 2C shows a structure of a sector shown in FIG. 2B, and FIG. 2D shows physical address information included in the CRC shown in FIG. 2C. Furthermore, FIG. 2E shows logical block address information included in the CRC shown in FIG. 2C. FIG. 3 shows a conversion table for converting the logical block address recorded in the system region of the magnetic disk shown in FIG. 1 to a physical sector address.

A data region 34 is provided between servo regions 32 adjacent in the circumferential direction, as shown in FIG. 2A. Each of the servo regions 32 is formed as a servo sector. The data region 34 is formed of a plurality of data sectors (S0 to Sn) 36 as shown in FIG. 2B. A range of the data region 34 including a servo sector of the servo region 32 and the plural data sectors (S0 to Sn) 36 subsequent with the servo sector is also called a servo frame.

In addition, a read-in sector gap region 40, a region in which sector data 42 is stored, and a region where an ECC (error correcting code) 44 is stored are provided in each data sector (Sn) 36, as shown in FIG. 2C. In the read-in sector gap region 40, a Gap, a Sync (both not shown), etc. are recorded. The Gap separates adjacent data sector (Sn−1) 36 and the data sector (Sn) 36. The ECC (error correcting code) of the region 44 is used to correct the sector data 42 which has been read.

The sector data 42 is formed of a user data region 46 and a cyclic redundancy check (CRC) 48 as shown in FIG. 2C. When the sector data 42 is read, correctness of the user data is verified (checked) by the CRC code described in the CRC 48, in the CRC operator 18. In addition, when the data is written, the CRC 48 is added to the user data 46 and the user data is written in the sector data region 42.

A physical address code shown in FIG. 2D is added to an original code of the CRC code as seed data (or code) and the CRC code is generated, in the CRC operator 18, prior to the shipment of the disk drive apparatus from a factory. The original code is generated by applying a cyclic algorithm (generating polynomial) to the user data which is the data recorded in the region 46. The physical address code is the information generated when an address is designated by a physical address upon writing data to a certain data sector (Sn) 36. The physical address code includes a designated address flag 50, a cylinder number 52, a head number 54, and a sector number 56 as shown in FIG. 2D. The designated address flag 50 is a flag indicating that the address code is designated by the physical address, and "1" is described on the flag. The cylinder number 52 is the number by which the cylinder (track) can be specified. The head number 54 is the number by which any one of the plural heads can be specified. The sector number 56 is the number by which any one of the plural data sectors (S0 to Sn) can be specified. Sequential sector numbers (Sn) are assigned to the sequential data sectors (Sn) 36. The cylinder number 52, the head number 54 and the sector number 56 are the CHS information.

After the disk drive apparatus is shipped from a factory, the physical address code is rewritten to a logical block address (LBA) code upon writing the user data designated by the LBA. In other words, the logical block address code shown in FIG. 2E is added to the original code of the CRC code as seed data, and the CRC code is generated, in the CRC operator 18. The original code is generated by applying the cyclic algorithm (generating polynomial) to the user data which is the data recorded in the region 46. More specifically, the CRC code is generated by applying the cyclic algorithm (generating polynomial) to the user data, in the CRC operator 18, and the LBA code is added to the CRC code as the seed data. The LBA code is the information generated when an address is designated by the LBA upon writing data to a certain data sector (Sn) 36. The LBA code includes a designated address flag 58 and an LBA region 60 as shown in FIG. 2E. The designated address flag 58 is a flag indicating that the address code is designated by the logical address (LBA), and "0" is described on the flag. The LBA is the address information supplied from the host 19 upon reading the data from or writing the data to the certain data sector (Sn) 36.

Next, formatting in a manufacturing process of the disk drive apparatus shown in FIG. 1 will be described. In the manufacturing of the disk drive apparatus, a blank disk 1 is prepared and built in the disk drive apparatus shown in FIG. 1. The blank disk 1 is formatted by the head 3. In the formatting, the servo region 32 is first formed on the disk 1, and the plural data sectors (S0 to Sn) 36 are formed in the data region 34 between the servo regions 32. In addition, the read-in sector gap 40 is formed in each of the data sectors (S0 to Sn) 36, and the adjacent data sectors (S0 to Sn) 36 are thereby partitioned. Then, the sector data 42 including a surface analysis test (SAT) pattern, which is the user data, is written in the data sector 36 together with the ECC 44. The SAT pattern is supplied from the host 19 to the HDC 13, based on designation of the physical address, and is written on the disk 1 by the write head 10W via the write channel 12W and the head amplifier 11. In the writing, the CRC code including the physical address code shown in FIG. 2D together with the SAT pattern is written in the sector data 42. Sequential physical address codes are written in sequential elements of the sector data 42.

In the verification of the disk surface using the SAT pattern, the sector data 42 is read by the read head 10R, and the physical address code shown in FIG. 2D, which is included in the CRC code together with the SAT pattern, is read by the HDC 13 via the read channel 12R. It is determined based on the read sector data 42 and the ECC 44 whether the data sector 36 is normal or defective. If the data sector is defective as a result of the determination, defect information is written in a defect table, which is temporarily prepared in the buffer memory 16, as shown in FIG. 3. The physical address (P0 to Pn) corresponding to the sector number (S0 to Sn) is described in the defect table. If a defect is found, it is described that the sector specified by the physical address is defective. A management table shown in FIG. 3 is generated by using the defect table. In the management table, sequential logical block addresses (LBAs) are allocated to the table to prevent a defective portion from being read or written, and the physical address corresponding to a reference LBA can be specified by referring to the LBA. Therefore, the logical block address (LBA) can be converted to the physical address by referring to the management table. The generated management table is stored in a nonvolatile recording region such as a system region of the disk 1, etc. After that, the disk drive apparatus is shipped without verification of the storage medium which writes the check pattern based on designation of the logical block address.

It is described in the management table shown in FIG. 3 that physical address P3 pictorially corresponding to the sector number (S3) is defective. In addition, the logical block address described in the management table can be rewritten when a defect occurs in a sector, after the shipment from a factory.

In the verification of the disk surface, as described above, the SAT pattern which is the user data, and the CRC code based on the SAT pattern are written in the sector data 42 included in each sector. The physical address including a designated address flag (1) shown in FIG. 2D is therefore embedded in the CRC 48, after the defect check.

The disk drive of the present embodiment is shipped without the checking step of writing the check pattern based on designation of the logical block address, as described above. Therefore, the defect information is merely described in the management table for converting the logical block address (LBA) to the physical address, in the disk drive, immediately after the shipment from a factory. Then, the state in which not the logical block address (LBA), but the physical address is added to the CRC 48 is maintained in each of the sectors (S0 to Sn) 36. When the data sector 36 is written based on the designation of the logical block address (LBA), by the user operation, after the shipment from a factory, the formatting (logical formatting) based on the designation of the logical block for the data sector 36 is completed as described with reference to FIG. 4.

Figure 4:
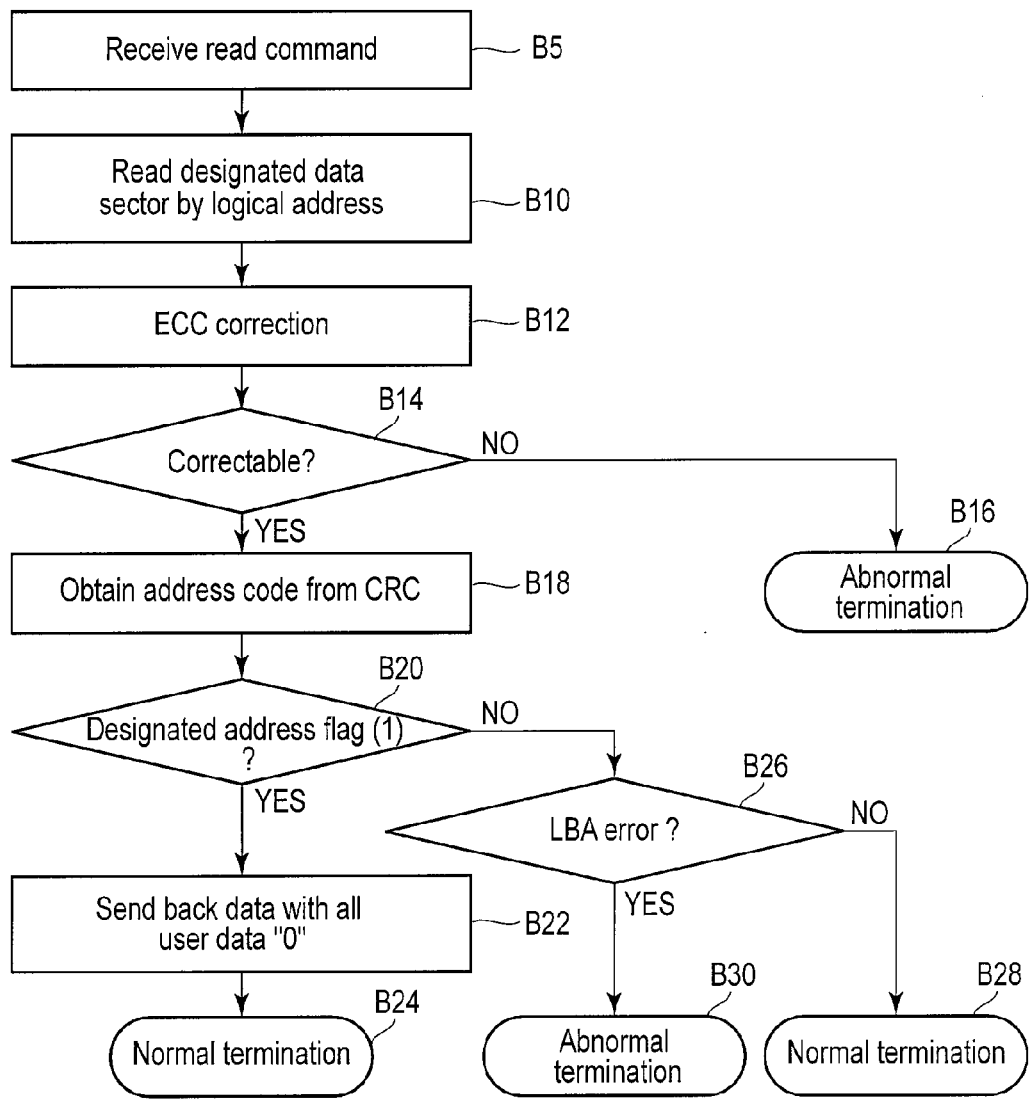
FIG. 4 is a flowchart showing reading from a designated sector in the disk drive of the embodiment.

Next, an operation of reading the sector in the disk drive after the shipment from a factory will be described with reference to FIG. 4. FIG. 4 is a flowchart showing reading from a designated sector in the disk drive of the present embodiment.

When a command to read the data sector 36 based on the designation of the LBA is input from the host 19 (B5) as shown in FIG. 4, in the disk drive shipped from a factory, the system region of the disk 1 is searched and the management table shown in FIG. 3 is read. The management table is temporarily stored in the buffer memory 16. The logical block address included in the command is converted to the physical address (CHS) by referring to the management table. Accordingly, the read head 10R, the cylinder and the sector are designated based on the physical address. Thus, the designated read head 10R is positioned in the designated cylinder, and the sector data 42 and the ECC 44 are read from the data sector (designated data sector) 36 designated in the cylinder (B10). Next, the sector data 42 is subjected to ECC correction in the ECC 44 (B12). If the sector data 42 cannot be subjected to the ECC correction ("NO" in B14), the logical reading of the designated data sector 36 is terminated abnormally (B16). If the ECC correction of the sector data 42 is successful ("YES" in B14), the address code shown in FIG. 2D or FIG. 2E as added to the CRC 48 is acquired (B18). If the designated data sector 36 is subjected to logical reading for the first time, in the disk drive apparatus shipped from a factory, a flag of the physical address designation (1) is included and the cylinder number 52, the head number 54 and the sector number 56 are described as the physical addresses, in the address code, as shown in FIG. 2D ("YES" in B20). In this case, the formatting data in which all elements of the user data 46 are "0" is transmitted to the host 19 (B22). After that, the logical reading of the designated data sector 36 is completed and normally terminated (B24).

In B20, if the flag of the physical address designation (1) is not included (i.e., the designated address flag is "0") in the address code as shown in FIG. 2E ("No" in B20), the LBA is described as shown in FIG. 2E. It is confirmed whether reading the described LBA is not an error (B26). For example, the LBA is compared with the logical block address included in the command transmitted from the host 19. If the logical block address (LBA) is described correctly (NO in B26), the user data is read from the designated data sector 36, and the read user data is transmitted to the host 19. Reading the designated data sector 36 is terminated normally (B28). If the logical block address (LBA) includes an error in B26 ("YES" in B26), the user data is not read from the data sector, and the logical reading of the designated data sector 36 is terminated abnormally and the abnormal termination of the logical reading is transmitted to the host 19 (B30).

If the data sector in which the physical address is written is read based on the designation of the logical block address, in the flowchart shown in FIG. 4, the reading is not recognized as a CRC error, but the data in which all elements of the user data are "0" is transmitted to an upper host. Therefore, the logical formatting can be omitted after verifying the disk surface by the physical formatting in a factory.

Next, an operation of writing the data to the data sector 42 will be described with reference to FIG. 5. FIG. 5 is a flowchart showing writing to the designated sector in the disk drive of the present embodiment.

If the user data of the designated data sector 36 is rewritten, in the disk drive of the present embodiment, a write command is input from the host 19 to the HDC 13 together with the user data (B38). The logical block address (LBA) of the designated data sector 36 is taken from the write command, and the CRC code is computed in the CRC operator 18, based on the user data and the logical block address (LBA) code including the designated address flag (0). (B40) In addition, the ECC code is computed based on the user data and the CRC code. (B42) The computed CRC code, the computed ECC code, and the user data are written in the designated data sector 36. (B44) Thus, in the writing of the user data of the designated data sector 36, the designated address flag (1) is converted to the designated address flag (0) and the physical address is rewritten to the logical address, for the first time.

In the disk drive apparatus of the above-described embodiment, the time to write the data by the logical block address is saved for the formatting prior to the shipment from a factory, after the disk drive is tested based on the designation of the physical address in the manufacturing process. In other words, the disk drive apparatus is based on shipping the disk in which the data is written based on the designation of the physical address without writing the data in the data sector based on the designation of the logical block address. The writing of the data based on the designation of the physical address is explicitly indicated by recording the designated address flag (1) in the data sector. Even if the data is not written in the data sector based on the designation of the logical block address prior to the shipment from a factory, the data in the data sector is capable of being read based on the logical block address and the physical address is rewritten to the logical block address after the shipment from a factory. Therefore, the logical formatting to be executed prior to the shipment from a factory is unnecessary, and the time required for the manufacturing process can be reduced remarkably.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk drive apparatus, comprising:
a disk including a plurality of data sectors each having a region for recording user data; and
a controller which receives a read command from a host, the read command including a logical block address for designating a data sector, reads data from the designated data sector specified by a physical address corresponding to the logical block address included in the read command, and sends back predetermined data to the host, the predetermined data being different from the data read from the designated data sector, in response to information relevant to the physical address included in the read data.

2. The apparatus of claim 1, wherein
the information relevant to the physical address comprises a first flag indicating that the physical address is recorded in the read data, and
the controller determines that the physical address is included in the data read from the designated data sector based on the first flag and sends back the predetermined data to the host.

3. The apparatus of claim 1, wherein
the information relevant to the physical address comprises a second flag indicating that the logical block address is recorded in the read data in stead of the physical address, and
the controller searches for the logical block address from the read data based on the second flag.

4. The apparatus of claim 1, wherein
a CRC code is recorded together with the user data, in the data sector, and
the controller verifies the user data by the CRC code, and reads an address code added to the CRC code.

5. The apparatus of claim 4, wherein
the address code comprises a first flag indicating that the data is a designation of the physical address, a cylinder number, a head number, and a sector number.

6. The apparatus of claim 1, wherein
the disk comprises a system region where a converting information is recorded, the converting information being for converting the logical block address to the physical address.

7. The apparatus of claim 4, wherein
the address code comprises a second flag indicating that the address code includes the logical block address instead of the physical address.

8. A method of reading data in a disk drive apparatus comprising a disk including a plurality of data sectors each having a region for recording user data, the method comprising:
receiving a read command from a host, the read command including a logical block address for designating a data sector;
reading data from the designated data sector specified by a physical address corresponding to the logical block address included in the read command; and
sending back predetermined data to the host, the predetermined data being different from the data read from the designated data sector, in response to information relevant to the physical address included in the read data.

9. The method of claim 8, wherein
the information relevant to the physical address comprises a first flag indicating that the physical address is recorded in the read data, and
the method further comprises determining that the physical address is included in the data read from the designated data sector based on the first flag and sending back the predetermined data to the host.

10. The method of claim 8, wherein
the information relevant to the physical address comprises a second flag indicating that the logical block address is recorded in the read data in stead of the physical address, and
the method further comprises searching for the logical block address from the read data based on the second flag.

11. The method of claim 8, wherein
a CRC code is recorded together with the user data, in the data sector, and
the user data is verified by the CRC code, and an address code added to the CRC code is read.

12. The method of claim 11, wherein
the address code comprises a first flag indicating that the data is a designation of the physical address, a cylinder number, a head number, and a sector number.

13. The method of claim 8, wherein
the disk comprises a system region where a converting information is recorded, the converting information being for converting the logical block address to the physical address.

14. The method of claim 11, wherein
the address code comprises a second flag indicating that the address code includes the logical block address instead of the physical address.

* * * * *